United States Patent

Nakamura et al.

Patent Number: 5,393,801
Date of Patent: Feb. 28, 1995

[54] ELECTRON BEAM-CROSSLINKABLE PLASTISOL

[75] Inventors: Eitaro Nakamura, Tokyo; Kazunori Ueki, Yokohama, both of Japan

[73] Assignee: Nippon Zeon Co., Ltd., Tokyo, Japan

[21] Appl. No.: 843,254

[22] Filed: Feb. 28, 1992

[30] Foreign Application Priority Data

Feb. 28, 1991 [JP] Japan .................................. 3-058323

[51] Int. Cl.$^6$ .............................................. C08F 2/46
[52] U.S. Cl. ......................................... 522/79; 522/121
[58] Field of Search ..................................... 522/79, 121

[56] References Cited

U.S. PATENT DOCUMENTS

| | | | |
|---|---|---|---|
| 3,050,507 | 8/1962 | Rees | 525/387 |
| 3,723,570 | 3/1973 | Adelman | 526/273 |
| 3,723,571 | 3/1973 | Haskell | 526/273 |
| 3,936,411 | 2/1976 | Hahn | 522/106 |
| 4,187,159 | 2/1980 | Goswami | 522/121 |
| 4,297,185 | 10/1981 | Chevreux | 522/96 |
| 4,434,251 | 2/1984 | Sasajima | 522/121 |
| 4,465,572 | 8/1984 | Graham | 522/121 |
| 4,523,983 | 6/1985 | Lin | 522/106 |
| 4,537,805 | 8/1985 | Lin | 522/114 |
| 4,999,071 | 3/1991 | Nakamura | 526/273 |
| 5,091,487 | 2/1992 | Hori | 526/273 |

Primary Examiner—Marion E. McCamish
Assistant Examiner—Mark A. Chapman
Attorney, Agent, or Firm—Sherman and Shalloway

[57] ABSTRACT

An electron beam-crosslinkable plastisol is provided comprising, as requisite components, (A) a particulate epoxy group-containing paste resin for plastisol processing having an epoxy group concentration on the particle surface of $1 \times 10^{-5}$ to $1 \times 10^{-3}$ g equivalent/g and an average particle size of 0.05 to 5 $\mu$m, ($B_1$) an unsaturated acid having a pKa less than 4, ($B_2$) an amino group-containing unsaturated compound, and (C) a plasticizer. This plastisol can effectively be crosslinked by application of an electron beam of low-speed energy to give moldings having suitable properties.

20 Claims, No Drawings

ELECTRON BEAM-CROSSLINKABLE PLASTISOL

This invention relates to a novel electron beam-crosslinkable plastisol, more detailedly to a plastisol which can effectively be crosslinked by application of an electron beam of low-speed energy to give a molding having desired physical properties.

A plastisol obtained by dispersing a vinyl chloride paste resin in a plasticizer can be handled as a liquid and possesses characteristics, for example, that it can be solidified by heating. Therefore, the plastisol can be processed by processing methods in a much wider range, compared to the processing of conventional thermoplastic plastics and rubbers, and is widely applied, for example in floor covering materials, wall covering materials, playthings, interior automotive trims, coated steel plates, etc.

Such a plastisol, in spite of being a thermoplastic resin, can be processed by the same method as in thermosetting resin. This is due to the fact that the strength of the intermolecular force of polyvinyl chloride and the absorption speed of the plasticizer to relieve this intermolecular force drastically change between temperatures higher and lower than the glass transition temperature as a boundary line of the polyvinyl chloride. However, the plastisol is essentially a thermoplastic resin and has had a problem that it has the same disadvantages on use characteristics at a high temperature, e.g. deformation and/or fusing at a high temperature as in general processed polyvinyl chloride products.

It is widely tried in general polyvinyl chloride to improve its heat distortion resistance by crosslinking it using a chemical crosslinking agent. However, when the chemical crosslinking agent is kneaded in a melted state with heating and the kneaded materials are subjected to conventional thermoplastic molding methods such as extrusion, rolling and injection, crosslinking reaction also takes place in the processing and shaping steps and therefore it has been difficult to make sufficient degree of crosslinking and processability consistent.

On the other hand, plastisol, which is liquid at room temperature at the time of mixing and solidifies by melting with heating, has an advantage that by compounding the chemical crosslinking agent therein the problems of deformation with heat and/or fusing of moldings can be improved without its processability being spoiled. However, the addition of chemical crosslinking agent often brings about lowering of its water resistance, weather resistance, transparency and so on, and thus it is the present state of things that greatest care is paid in processing and compounding.

On the other hand, although apart from such chemical crosslinking methods, a crosslinking method is known using a high energy beam such as radiation, this method is not practical because it simultaneously causes decomposition of the polyvinyl chloride and consequent discoloration is intense. Recently, an apparatus was put to practical use applying an electron beam of a relatively low-speed energy of the order of 150 to 300 kV and thereby the miniaturization of apparatuses and enhancement of safety are aimed at. However, crosslinking of polyvinyl chloride has not hitherto been attained by such a low-speed energy beam.

Thus, in order to obtain a plastisol capable of being crosslinked even by such a low-speed energy beam, a method is tried wherein to a paste resin is compounded a polymerizable compound such as, for example, diallyl phthalate, trimethylolpropane triacrylate, an oligoester acrylate or an epoxyacrylate. However, in this method, compatibility between the polymerizable unsaturated compound and the paste resin is insufficient, and there were disadvantages, for example, that printability is lowered by bleeding of the unsaturated compound onto the surface of the molding before irradiation with an electron beam and the surface of the molding after irradiation becomes brittle. Further, many of moldings obtained by such crosslinkable plastisols have a large hardness change by crosslinking, and thus it has been difficult to obtain flexible and tough moldings.

On the other hand, polymethyl methacrylate resins are known as resins capable of plastisol processing other than polyvinyl chloride, but these resins have the same problems as in the polyvinyl chloride resin plastisols.

The object of this invention is to provide an electron beam-crosslinkable plastisol wherein disadvantages are overcome which such conventional crosslinking methods have and which can efficiently be crosslinked by irradiation with an electron beam having a low-speed energy and can give moldings having desirable physical properties.

As a result of intense study, the present inventors have found that a plastisol comprising, as requisite components a certain, particulate epoxy group-containing paste resin for plastisol processing, an unsaturated acid or amino group-containing unsaturated compound, and a plasticizer, is one capable of attaining the above objects.

Thus, according to this invention is provided an electron beam-crosslinkable plastisol comprising, as requisite components, (A) a particulate epoxy group-containing paste resin for plastisol processing having an epoxy group concentration on the particle surface of $1 \times 10^{-5}$ to $1 \times 10^{-3}$ g equivalent/g and an average particle size of 0.05 to 5 $\mu$n, (B$_1$) an unsaturated acid having a pKa less than 4 or (B$_2$) an amino group-containing unsaturated compound, and (C) a plasticizer.

In the plastisol of the invention, as the (A) component is used a particulate epoxy group-containing paste resin for plastisol processing, having an epoxy group concentration on the particle surface of $1 \times 10^{-5}$ to $1 \times 10^{-3}$ g equivalent/g and an average particle size of 0.05 to 5 $\mu$m.

As the epoxy group-containing paste resin there can, for example, be mentioned an epoxy group-containing resin using as the main component vinyl chloride or methyl methacrylate. This epoxy group-containing resin can, for example, be prepared by (1) a method which comprises copolymerizing vinyl chloride or methyl methacrylate, an epoxy group-containing monomer copolymerizable therewith and, if desired, a copolymerizable monomer, (2) a method which comprises dehydrochlorinating in the presence of an alkali a conventional particulate vinyl chloride paste resin mainly containing the vinyl chloride units to form double bonds on the surface of the polymer particles and then epoxidizing it an epoxidizing agent such as peracetic acid, or so on.

Examples of the epoxy group-containing monomer copolymerizable with vinyl chloride or methyl methacrylate, used in the method (1) are glycidyl ethers of unsaturated alcohol such as allyl glycidyl ether and methallyl glycidyl ether; glycidyl esters of unsaturated acid such as glycidyl methacrylate, glycidyl acrylate, glycidyl p-vinylbenzoate, methyl glycidyl itaconate, glycidyl ethyl maleate, glycidyl vinylsulfonate and glycidyl (meth)allylsulfonate; epoxide olefins such as butadiene monoxide, vinylcyclohexene monoxide and 2-methyl-5,6-epoxyhexene, etc. These epoxy group-containing monomers may be used alone or in a combination of two or more.

Examples of the monomer copolymerizable with vinyl chloride, used according to necessity are fatty acid vinyl esters such as vinyl acetate and vinyl propionate; olefins such as ethylene and propylene; halogenated vinylidenes such as vinylidene chloride and vinylidene fluoride; vinyl ethers such as isobutyl vinyl ether, methyl vinyl ether and cetyl vinyl ether, etc. Examples of the monomer copolymerizable with methyl methacrylate, used according to necessity are alkyl or alkanol esters of (meth)acrylic acid such as ethyl acrylate, butyl acrylate and butyl methacrylate, and further acrylonitrile, styrene, ethylene, propylene, butadiene, isoprene, dimethyl maleate, dimethyl fumarate, etc.

There is no particular limitation about the method of preparing the paste resin (A) using these monomers, and methods conventionally used in preparation of resins for paste processing can be utilized but a seed emulsion polymerization method and a fine suspension polymerization method are particularly preferred.

The fine suspension polymerization method is a method which comprises using an oil soluble initiator as the initiator, previously adjusting the particle size of the monomer oil drop by homogenization treatment before the initiation of polymerization and subjecting the suspension to homogeneous dispersion polymerization. In such a fine suspension polymerization method, an oil soluble radical initiator is used as an intiator. Examples of this oil soluble radical initiator are diacyl peroxides such as dibenzoyl peroxide, di-3,5,5-trimethylhexanoyl peroxide and dilauroyl peroxide; peroxydicarbonates such as diisopropyl peroxydicarbonate, di-sec-butyl peroxydicarbonate and di-2-ethylexyl peroxydicarbonate; peroxyesters such as t-butyl peroxypivalate and t-butyl peroxyneodecanoate; organic peroxides such as acetylcyclohexylsulfonyl peroxide and disuccinic acid peroxide; azo compounds such as 2,2'-azobisisobutyronitrile, 2,2'-azobis-2-methylbutylbutyronitrile and 2,2'-azobisdimethylvaleronitrile, etc. These catalysts may be used alone or in a combination of two or more. Its use amount is appropriately selected depending on the kind, amount and charge method of the monomers, but usually selected in the range of 0.001 to 5.0 weight part per 100 weight part of the monomers to be used.

In the fine suspension polymerization method, a surfactant is usually used. Examples of this surfactant include anionic surfactants, for example, alkyl sulfate ester salts such as sodium lauryl sulfate ester and sodium myristyl sulfate ester; alkylarylsulfonate salts such as sodium dodecylbenzenesulfonate and potassium dodecylbenzenesulfonate; sulfosuccinic ester salts such as sodium dioctylsulfosuccinate and sodium dihexylsulfosuccinate; fatty acid salts such as ammonium laurate and potassium stearate; polyoxyethylenealkyl sulfate ester salts, polyoxyethylenealkylaryl sulfate ester salts, etc.; nonionic surfactants, for example, sorbitan esters such as sorbitan monooleate and polyoxyethylenesorbitan monostearate; polyoxyethylene alkyl ethers, polyoxyethylene alkylphenyl ethers, polyoxyethylene alkyl esters, etc.; cationic surfactants such as cetylpyridinim chloride and cetyltrimethylammonium bromide, etc.

These may be used alone or in a combination of two or more. Its use amount is usually selected in the range of 0.05 to 5 weight parts, preferably 0.2 to 4.0 weight parts per 100 weight parts of the monomers to be used.

In this fine suspension polymerization method, to an aqueous medium are added first the oil soluble initiation, the monomers, the surfactant and, if desired, a polymerization assistant such as a higher fatty acid or higher alcohol and other additives, and the mixture is premixed by homogenization treatment using a homogenizer to adjust the particle of the oil drop. As the homogenizer is for example mentioned a colloid mill, a vibrating agitation, a two-stage high-pressure pump, high-pressure injection from a nozzle or orifice, ultrasonic agitation or the like. Further, the adjustment of the particle size of the oil drop is influenced by control of the shearing force at the time of homogenization treatment, agitation conditions during polymerization, the model of reaction apparatus, amounts of the surfactant and additives, etc., but on these matters suitable conditions can be selected by simple preliminary experiments.

Then, the thus homogenization-treated premix liquid is transferred into a polymerizer and heated with gentle agitation, and polymerization is generally carried at a temperature in the range of 30° to 80° C.

Thus a latex is obtained wherein fine particles of the copolymer having an average particle size of 0.05 to 5 μm are homogeneously dispersed. By subjecting this latex to a known treatment such as salting-out or spray drying, the polymer is taken out as a solid matter. The molecular weight of the polymer can appropriately adjusted in accordance with the purpose by the reaction temperature and/or a molecular weight-regulating agent.

On the other hand, the seed emulsion polymerization method is a method which comprises using as nuclei resin particles previously prepared by emulsion polymerization or fine suspension polymerization and using an anionic surfactant alone or together with a nonionic surfactant, and subjecting the particles to enlarging polymerization reaction in an aqueous medium. The average size of nucleus particles to be used is generally in the range of 0.03 to 0.7 μm and their use amount is usually selected in the range of 1 to 50 weight parts per 100 parts of monomers to be used.

As the anionic surfactant is used a known one usually used in emulsion polymerization. Examples thereof are, for example, alkylbenzenesulfonate salts, alkylsufonate salts, alkyl sulfate ester salts, metal salts of fatty acid, polyoxyalkyl ether sulfate ester salts, polyoxyethylenecarboxylic ester sulfate ester salts, polyoxyethylene alkylphenyl ether sulfate ester salts, dialkyl succinate ester sulfonate salts, etc. These may be used alone or in a combination of two or more.

Examples of the nonionic surfactant include compounds having the polyoxyethylene chain in the molecule and having a surface-active ability such as polyoxyethylene alkylphenyl ethers, polyoxyethylene alkyl ethers, fatty acid esters of polyoxyethylene, fatty acid esters of polyoxyethylenesorbitan, boric acid esters of polyoxyethylene alkyl ether glycerol, phosphoric acid esters of polyoxyethylene alkyl ether and polyoxyethylene; compounds wherein the polyoxyethylene chain of these compounds are replaced by copolymers of oxyethylene or oxypropylene; sorbitan fatty acid esters, fatty acid glycerol esters, glycerol fatty acid esters, pentaerythritol fatty acid esters, etc. These may be used alone or in a combination of two or more.

The use amount of these surfactants is selected in case of the anionic surfactant usually in the range of 0.1 to 5 weight parts per 100 weight parts of monomers to be used, and in case of the nonionic surfactant usually in the range of 0 to 5 weight parts per 100 weight parts thereof.

In this seed emulsion polymerization, a combination of a water soluble initiator or water soluble reducing agent with an organic peroxide is used as an initiator. As the water soluble initiator is used potassium persulfate, ammonium persulfate, hydrogen peroxide or the like. The use amount of these water soluble initiator is selected in the range of 0.001 to 5 weight parts per 100 weight parts of monomers to be used. As the water soluble reducing agent is preferred, for example, one which is water soluble and conventionally used as a catalytic component for radical oxidation-reduction polymerization. Specific examples thereof are ethylenediaminetetracetic acid or its sodium and potassium salts, or complex compounds thereof with heavy metals such as iron, copper and chromium, sulfinic acid or its sodium and potassium salts, L-ascorbic acid or its sodium, potassium and calcium salts, ferrous pyrophosphate, ferrous sulfate, ammonium ferrous sulfate, sodium sulfite, sodium bisulfite, sodium formaldehydesulfoxylate, reducing sugars, etc. These may be used alone or in a combination of two or more. The use amount of these reducing agents is usually selected in the range of 0.00001 to 5 weight parts per 100 weight parts of monomers to be used.

Examples of the organic peroxide are hydroperoxides such as cumene hydroperoxide, p-cymene hydroperoxide, t-butylisopropylbenzene hydroperoxide, diisopropylbenzene hydroperoxide, p-menthane hydroperoxide, decalin hydroperoxide, t-amyl hydroperoxide, t-butyl hydroperoxide and isopropyl hydroperoxide. These organic peroxides may be used alone or in a combination of two or more its use amount is usually selected in the range of 0.001 to 5 weight parts per 100 weight parts of monomers to be used.

A preferred example of the seed emulsion polymerization method is described below. First, after an aqueous emulsion of the desired resin nucleus particles was prepared, the water soluble reducing agent and monomers are added thereto, and the mixture is maintained at a temperature of the order of 30° to 80° C. by heating. On the other hand are prepared separately an aqueous emulsion of the organic peroxide using the surfactant and an aqueous solution of the surfactant. Usually, these are continuously added to the aqueous emulsion containing the resin nucleus particles, water soluble reducing agent and monomers while a temperature in the range of 30° to 80° C. is maintained, and thereby polymerization reaction is carried out. In this seed emulsion polymerization, a higher fatty acid, higher fatty alcohol, inorganic salt, water soluble high molecular compound or the like may be used together in order to assist the action of the surfactant and polymerization initiator to be used. After completion of the polymerization reaction, from the emulsion containing the formed copolymer particles the copolymer is taken out as solid matters in the same manner as in the case of fine suspension polymerization method. The molecular weight of this copolymer can appropriately be regulated by the reaction temperature, a molecular weight-regulating agent or the like in accordance with the purpose.

When an epoxy group-containing paste resin is prepared using such a method, it is important that contrivance is made on polymerization so that the epoxy group concentration on the particle surface becomes $1.0 \times 10^{-5}$ to $1 \times 10^{-3}$ g equivalent/g. For example, it is preferred to make a contrivance of supplying the epoxy group-containing monomer at the latter half of polymerization reaction and thereby enhancing the epoxy group concentration on the particle surface. Although it is also, of course, possible to enhance the surface epoxy group concentration of the paste resin particles by copolymerizing a large amount of the epoxy group-containing monomer, many of epoxy group-containing monomers decrease the intermolecular force of polyvinyl chloride and polymethyl methacrylate, and therefore a problem occurs that when the paste resin obtained using a large amount of the epoxy group-containing monomer is formed into plastisol, increase of its viscosity with time lapse tends to become large.

Examples of the alkali to be used for dehydrochlorination in the method (2) are alkali metal hydroxides and alkaline earth metal hydroxides such as sodium hydroxide, potassium hydroxide and calcium hydroxide; alkali metal carbonates such as sodium carbonate and potassium carbonate; amines such as pyridine, dimethylaniline and 1,8-diazabicyclo[5,4,0]undecene-7, etc.

In this method, a swelling agent can be used for the purposes of accelerating the dehydrochlorination reaction and the succeeding epoxidation reaction and regulating the reaction depth from the surface of the particles. Examples of this swelling agent are aliphatic and aromatic hydrocarbons such as butane, hexame and toluene; chlorinated hydrocarbons such as vinyl chloride, allyl chloride and methylene dichloride; alcohols and their ethers such as methanol, ethanol, propanol, ethylene glycol monopropyl ether and ethylene glycol diethyl ether, etc. Further, such an organic solvent as tetrahydrofuran, acetone or methyl ethyl ketone usually known as a solvent can also be used as a suitable swelling agent and in mixing with water or the above swelling agent.

The reactions of dehydrochlorination and succeeding epoxidation are usually carried out in the air or an inert gas or in a medium incapable of dissolving water and vinyl chloride resins. This method has an advantage that it is possible to heighten the epoxy group concentration on the particle surfaces but has a disadvantage that coloring due to the dehydrochlorination reaction is not perfectly removed even by epoxidation.

Thus, the method (1) is preferred as the preparation method for the epoxy group-containing resin (A) in the invention. It is necessary that the epoxy group-containing paste resin (A) has a spherical particle shape necessitated as paste resin and its average particle size is not longer than 5 $\mu$m. The distribution of particle size varies depending on polymerization methods, but generally obtained are a paste resin having a wide distribution whose peak is at about 1 $\mu$m, a paste resin having both a relatively large and narrow particle size distribution of the peak being at around 1 $\mu$m and a relatively small narrow particle size distribution of the peak being at 0.3 $\mu$m or less, etc. Such particle size distributions are within the range of particle size distributions known on conventional paste resins. When this average particle size goes beyond 5 $\mu$m, reactivity between the unsaturated acid ($B_1$) or the amino group-containing unsaturated compound ($B_2$) and epoxy groups in the paste resin are lowered, and moreover, the density of the crosslinked molding tend to become non-uniform. Further, when the average particle size is smaller than 0.05 μm, the viscosity of plastisol becomes high and increase of the viscosity with time lapse becomes large, resulting in difficulty in use.

The particle shape and particle size distribution of the epoxy group-containing paste resin can be confirmed by dispersing the paste resin in a medium such as water or an alcohol with ultrasonic waves, fixing the paste resin on a mesh to which a collodiol membrane was affixed and observing it by a microscope. In this occasion, particle aggregates are sometimes observed, but the particle size in the invention means the size of a single particle with exclusion of such particle aggregates.

Further, it is necessary that the epoxy group concentration on the surface of the paste resin particles is $1.0 \times 10^{-5}$ to $1.0 \times 10^{-3}$ g equivalent/g. When the epoxy group concentration is below $1.0 \times 10^{-5}$ g equivalent/g, reaction thereof with the unsaturated acid (B$_1$) or the amino group-containing unsaturated compound (B$_2$) is insufficient and the object of the invention cannot be accomplished. Further, when it goes beyond $1 \times 10^{-3}$ g equivalent/g, crosslinking among the epoxy groups becomes intense and gelation becomes insufficient even by heating. The epoxy group concentration on the particle surface can be determined, for example by adding the paste resin into a prescribed amount of methanol, dispersing it with ultrasonic waves, adding a prescribed amount of hydrochloric acid to allow them to react, and then titrating the unreacted excess hydrochloric acid with an alcoholic potassium hydroxide solution.

In the plastisol of the invention, as the (B$_1$) component is used an unsaturated acid having a strong acidity whose strength as acid exhibited as pKa is less than 4. In case of unsaturated acids having pKa of 4 or more, addition reaction with epoxy groups in the paste resin (A) is slow and it takes a long time in the step of gelation with heating before application of an electron beam, and thus discoloration tends to occur.

In this invention, the amino group-containing unsaturated compound (B$_2$) can be used in place of the unsaturated acid having pKa below 4 (B1). Further, it is also possible to use the unsaturated acid having pKa below 4 (B$_1$) and the amino group-containing unsaturated compound (B$_2$) in combination.

Examples of the unsaturated acid having pKa below 4 (B$_1$) are halogen-substituted (meth)acrylic acids such as chloroacrylic acid; unsaturated sulfonic acids such as 2-(meth)acrylamido-2-methylpropanesulfonic acid, vinylsulfonic acid and (meth)acrylic acid-2-sulfonic acid ethyl; unsaturated sulfuric acid esters such as ethyl (meth)acrylic acid-2-sulfate; unsaturated acidic phosphoric acid esters such as di-2-(meth)acryloxyethyl acid phosphate, di-2-(meth)acryloxypropyl acid phosphate, di-2-(meth)acryloxy-3-chloropropyl acid phosphate and polyoxyethylene(meth)acrylic ester acid phosphate, etc. Among them liquid acid phosphates are easy to use and suitable. These unsaturated acids may be used alone or in a combination of two or more.

Further, examples of the amino group-containing unsaturated compound (B$_2$) are dimethylaminoethyl (meth)acrylate, diethylaminoethyl(meth)acrylate, N-t-butylaminoethyl (meth)acrylate, dimethylaminopropyl methacrylamide, etc. These amino group-containing unsaturated compounds may be used alone or in a combination of two or more.

In the plastisol of the invention, a plasticizer is used as the (C) component. There is no particular limitation about this plasticizer, and one can be used which has hitherto conventionally been used as a plasticizer of plastisol. Specific examples thereof are phthalic acid derivatives such as dimethyl phthalate, diethyl phthalate, dibutyl phthalate, di-(2-ethylhexyl) phthalate, di-(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, di(heptyl, nonyl, undecyl) phthalate, benzyl phthalate, butyl benzyl phthalate, dinonyl phthalate and dicyclohexyl phthalate; isophthalic acid derivatives such as dimethyl isophthalate, di(2-ethylhexyl) isophthalate and diisooctyl isophthalate; tetrahydrophthalic acid derivatives such as di-(2-ethylhexyl) tetrahydrophthalate, di-n-octyl tetrahydrophthalate and diisodecyl tetrahydrophthalate; adipic acid derivatives such as di-n-butyl adipate, di-(2-ethylhexyl) adipate, diisodecyl adipate and diisonoyl adipate; azelaic acid derivatives such as di-(2-ethylhexyl) azelate, diisooctyl azelate and di-n-hexyl azelate; sebacic acid derivatives such as di-n-butyl sebacate and di-(2-ethylhexyl) sebacate; maleic acid derivatives such as di-n-butyl maleate, dimethyl maleate, diethyl maleate and di-(2-ethylhexyl) maleate; fumaric acid derivatives such as di-n-butyl fumarate and di-(2-ethylhexyl) fumarate; trimellitic acid derivatives such as tri-2-(ethylhexyl) trimellitate, tri-n-octyl trimellitate, triiosdecyl trimellitate, taiisooctyl trimellitate, tri-n-hexyl trimellitate and triisononyl trimellitate; pyromellitic acid derivatives such as tetra-(2-ethylhexyl) pyromellitate and tetra-n-octyl pyromellitate; citric acid derivatives such as triethyl citrate, tri-n-butyl citrate, triethyl acetylcitrate tri-(2-ethylhexyl) acetylcitrate; itaconic acid derivatives such as monomethyl itaconate, monobutyl itaconate, dimethyl itaconate, diethyl itaconate, dibutyl itaconate and di-(2-ethylhexyl) itaconate; oleic acid derivatives such as butyl oleate, glyceryl monooleate and diethylene glycol monooleate; ricinoleic acid derivatives such as methyl acetylricinoleate, butyl acetylricinoleate, glyceryl monoricinoleate and diethylene glycol monoricinoleate; stearic acid derivatives such as n-butyl stearate, glycerol monostearate and diethylene glycol distearate; other fatty acid derivatives such as diethylene glycol monolaurate, diethylene glycol dipelargonate and pentaerythritol fatty acid esters; phosphoric acid derivatives such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate and tris(chloroethyl) phosphate; glycol derivatives such as diethylene glycol dibenzoate, dipropylene glycol dibenzoate, triethylene glycol dibenzoate, triethylene glycol di-(2-ethylbutyrate), triethylene glycol di-(2-ethylhexanoate) and dibutylmethylene bis(thioglycolate); glycerol derivatives glycerol monoacetate, glycerol triacetate and glycerol tributyrate; epoxy derivatives such as epoxidized soybean oil, epoxybutyl stearate, di-2-ethylhexyl epoxyhexahydrophthalate, diisodecyl epoxyhexahydrophthalate, epoxytriglyceride, epoxidized octyl oleate and epoxidized decyl oleate; polyester plasticizers such as adipic acid polyesters, sebacic acid polyesters and phthalic acid polyesters; adhesive plasticizers; polymerizable plasticizers such as diallyl phthalate, acrylic monomers and acrylic oligomers, etc. These plasticizers may be used alone or in a combination of two or more. Further, although use of the polymerizable plasticizer is preferred from the point that it causes crosslinking together with the unsaturated acid (B1) or the amino group-containing unsaturated compound (B2), when the use amount of this polymerizable plasticizer is too large, the resulting molding tends to become too hard and become brittle.

The plastisol of the invention can contain, in ranges such that the object of the invention is not spoiled, other additive components which have so far conventionally been used in plastisol, such as, for example, a stabilizer, a thickener, a diluting agent, an ultraviolet absorber, a light stabilizer, a pigment, a dye, a filler, an adhesion-bestowing agent and a reinforcing agent.

The plastisol of the invention can be molded and processed into a desired shape according to a method having so far been known as a processing method for plastisol such as, for example coating, extrusion, immersion, casting, slush molding, rotational molding or spraying, and then irradiated with an electron beam to give a crosslinked molding.

Suitable as the electron beam to be used for crosslinking is one obtained from an electron beam accelerator in view of control of absorbed dose, safety and easiness of introduction into the preparation step. Crosslinking with the electron beam is suitably carried out using an electron beam accelerator having an accelerating voltage of the electron beam of 100 to 750 kV, preferably 150 to 300 kV and applying the electron beam so that the absorbed dose becomes the order of 0.5 to 20 megarads.

This invention is more detailedly described below according to examples, but this invention is not limited at all by these examples.

The performance of plastisol was determined as follows.

(1) Bleeding

A resin-coated steel plate before irradiation with the electron beam was maintained under the conditions of a temperature of 45° C. and a relative humidity of 60% for 1 week, and then the degree of bleeding onto the surface of the resin was judged by touching in accordance with the following criterion.

○: There is no bleeding,
Δ: There is some bleeding,
×: There is clear bleeding and sticking.

The degree of bleeding shows the same tendency as in the badness of roll release at the time of embossing.

(2) Solvent resistance

A specimen 20 mm square was cut out from the steel plate after crosslinking by irradiation with the electron beam, immersed in 100 ml of tetrahydrofuran and shaken at 25° C. for 24 hours. Then, the state of the coat was observed with the naked eye and evaluated according to the following criterion.

○: The coat is swelled, but not dissolved nor peeled,
Δ: The coat is swelled and peeled, and destroyed, but its shape is retained.
×: The coat is dissolved.

(3) Heat resistance

A specimen 20 mm×100 mm was cut out from the steel plate after crosslinking by irradiation with the electron beam and heated at 220° C. for 1 minute. Then, the degree of maintenance of the emboss on the surface was observed with the naked eye and evaluated according to the following criterion.

○: The emboss is not changed,
Δ: The emboss becomes obscure,
×: The emboss disappears.

[Preparation Example 1]

preparation of an epoxy group-containing vinyl chloride paste resin 10 g of sodium bicarbonate, 29 kg of water, 50 g of dioctyl sulfosuccinate, 200 g of dioctyl phthalate and 40 g of dioctyl peroxydicarbonate were put into a pressure vessel equipped with an agitator and deaerated, and then 7 kg of vinyl chloride was added and the mixture was mixed with agitation for 30 minutes. The resulting mixture was transferred through a homogenizer into a reaction vessel equipped with a jacket which had been deaerated and into which 1.5 kg of vinyl chloride had been charged, and heated 42° C. to start polymerization.

At the tie when the polymerization conversion reached 60%, a uniform mixture of 1250 g of vinyl chloride and 250 g of glycidyl methacrylate was continously poured into the reaction vessel at 300 g/hour. The total polymerization conversion after completion of the pouring was 75%. After the polymerization was further proceeded with up to the conversion of 85%, the unreacted vinyl chloride was removed by heating under reduced pressure. The remaining contents were dried by a spray dryer and ground to obtain an epoxy group-containing vinyl chloride resin (resin P).

The average particle size of this resin P was 0.92 μm and the surface epoxy group concentration was $3.2 \times 10^{-5}$ g equivalent/g.

The surface epoxy group concentration was measured as follows.

Namely, 5 g of the resin, 1 ml of 1N aqueous hydrochloric acid solution and 100 ml of methanol were put in a 300-ml wide-mounted vessel with ground stopper, mixed for 1 hour with a magnetic stirrer, subjected to ultrasonic treatment at 40° C., and then titrated with a 1/10N KOH alcohol solution (titration amount a ml). On the other hand, the same procedure as above was carried out without use of the resin to measure the titration amount of blank (b ml). The surface epoxy group concentration was determined by the following equation.

Surface epoxy group concentration (g equivalent/g) = $[(b-a)f_2 \times 0.1/W] \times 10^{-3}$ $f_1$: Factor of the 1N HCl solution
$f_2$: Factor of the 1/10N KOH solution
w: Weight of the sample g

[Preparation Example 2]

Preparation of an epoxy group-containing polymethyl methacrylate paste resin

The same procedure as in Preparation example 1 was carried out except that, in preparation example 1, methyl methacrylate was substituted for vinyl chloride and 20 g of dodecylmercaptan was added as a chain transfer agent, whereby an epoxy group-containing polymethyl methacrylate (resin Q) was prepared. The final polymerization conversion was 97%, the average particle size of resin Q was 1.2 μm and the surface epoxy group concentration was $2 \times 10^{-5}$ g equivalent/g.

[Preparation example 3]

Preparation of a polymethyl methacrylate paste resin

The same procedure as in preparation example 2 was carried out except that, in preparation example 2, ethyl acrylate was substituted for glycidyl methacrylate, whereby an epoxy group-not containing polymethyl methacrylate (resin R) was prepared. The final polymerization conversion was 96% and the average particle size of resin R was 1.2 μm.

[Examples 1 to 4 and comparative examples 1 to 4]

100 weight parts of the paste resin of the kind shown in Table 1, 10 weight parts of the polymerizable unsaturated compound of the kind shown in Table 1 and 45 weight parts of the plasticizer of the kind shown in Table 1 were mixed together with 20 weight parts of titanium oxide toner and 3 weight parts of dibasic lead sulfite to prepare a plastisol.

The plastisol was applied onto a steel plate previously treated with an acrylic epoxy primer so that the thickness became 300 μm, and the resulting steel plate was heated at 200° C. for 2 minutes to obtain a resin-coated steel plate. This resin-coated steel plate was heated again, subjected to satin-embossing processing (connex part 0.2 R, distance between peaks 1.2 mm), and then irradiated with an electron beam under the conditions of a accelerating voltage of 168 kV and an irradiation amount of 10M rad for crosslinking. The results are shown in Table 1.

(d): oligo ester acrylate, M-6100, produced by Toagosei Chemical Industry Co., Ltd.
DOP: dioctyl phthalate
TCP: tricresyl phosphate

[Examples 5 and 6 and Comparative example 5]

100 weight parts of the paste resin shown in Table 2 and 10 weight parts of the polymerizable unsaturated compound shown in Table 2 were mixed together with 50 weight parts of dioctyl phthalate, 20 weight parts of heavy calcium carbonate, 15 weight parts of titanium oxide, 6 weight parts of azodicarbonamide, 3 weight parts of the Na—Zn stabilizer, 8 weight parts of mineral spirit and 0.5 weight part of sodium dodecylbenzenesulfonate to prepare a plastisol.

The plastisol was applied onto a sheet of fire retardant paper so that the thickness became 170 μm, heated at 150° C. for 1.5 minutes to make it gelate. After the coating thickness was measured, the gel was foamed with heating in an oven of 200° C. and the resulting resin foam was measured for foaming magnification $m_1$. This foam was irradiated with an electron beam under

TABLE 1

| | Example 1 | Example 2 | Example 3 | Example 4 | Comparative example 1 | Comparative example 2 | Comparative example 3 | Comparative example 4 |
|---|---|---|---|---|---|---|---|---|
| Used raw materials | | | | | | | | |
| Paste resin | P | P | P | Q | Zeon 121 | Zeon 121 | Zeon 121 | R |
| Polymerizable unsaturated compound | (a) | (b) | (c) | (a) | (b) | (a) | — | (a) |
| Plasticizer | DOP | DOP | DOP | TCP | DOP | DOP | DOP | TCP |
| Evaluation | | | | | | | | |
| Bleeding | ○ | ○ | ○ | ○ | x | x | ○ | Δ |
| Solvent resistance | ○ | ○ | ○ | ○ | Δ | Δ | x | Δ |
| Heat resistance | ○ | ○ | ○ | ○ | Δ | Δ | x | Δ |

Note

Zeon 121: produced by Nippon Zeon Co., ltd., vinyl chloride paste resin (homopolymer)

(a): methacryloxyethyl acid phosphate (a mixture of the monoester and diester; mono/di weight ratio=1/9), pKa=2.3

(b): polyoxyethylene methacrylic ester acid phosphate containing 70 weight % of compounds of the following structure, pKa=2.3

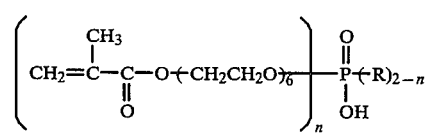

[The compounds are a mixture of the compound wherein R is OH and the compound wherein R is

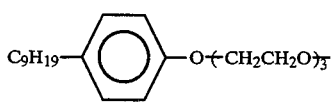

in a mole ratio of 1:4, the number 6 in —(CH$_2$—CH$_2$—O)— is a value showing the rough average value on the mixture, and n is a value of $1 \leq n \leq 2$.]

(c): N-t-butylaminoethyl methacrylate the conditions of an accelerating voltage of 162 kV and an irradiation dose of 5M rad using an electrocurtain type electron beam accelerator produced by ESI Co. The resulting foam was heated again in a far infrared radiation oven at a surface temperature of 220° C. for 1 minute and then measured for the foaming magnification $m_2$, and further the magnification retention rate $m_2/m_1$ was calculated. The results are shown in Table 2.

TABLE 2

| | Example 5 | Example 6 | Comparative 5 |
|---|---|---|---|
| Used raw material | | | |
| Polymerizable unsaturated compound (weight ratio) | (b) | (b)/(d) (50/50) | (b) |
| Evaluation | | | |
| Foaming magnification $m_1$ | 9.7 | 10.1 | 9.7 |
| Magnification retention rate $m_2/m_1$ | 1.2 | 1.3 | 0.4 |

As is apparent from the foregoing examples, as a result of the fact that the electron beam-crosslinkable plastisol of this invention comprises, as requisite components, a certain epoxy group-containing paste resin (A), a certain unsaturated acid (B$_1$) or certain amino group-containing unsaturated compound (B$_2$), and a plasticizer (C), the plastisol can effectively crosslinked by irradiation with an electron beam having low-speed energy to a molding having desirable properties.

What is claimed is:

1. An electron beam-crosslinkable plastisol comprising (A) a particulate epoxy group-containing vinyl chloride or methyl methacrylate paste resin for plastisol processing having an epoxy group concentration on the particle surface of $1\times10^{-5}$ to $1\times10^{-3}$ g equivalent/g and an average particle size of 0.05 to 5 μm, ($B_1$) an ethylenically unsaturated acid having a pKa less than 4, ($B_2$) an amino group-continining ethylenically unsaturated compound or a mixture of ($B_1$) and ($B_2$), and (C) a plasticizer.

2. The electron beam-crosslinkable plastisol of claim 1 wherein the epoxy group-containing paste resin (A) is a copolymer of vinyl chloride or methyl methacrylate with an epoxy group-containing monomer selected from a glycidyl ether of an unsaturated alcohol, a glycidyl ester of an unsaturated acid and an epoxy group-containing unsaturated hydrocarbon.

3. The electron beam-crosslinkable plastisol of claim 1 wherein the unsaturated acid having a pKa less than 4 ($B_1$) is an acid selected from a halogen-substituted (meth)acrylic acid, an unsaturated sulfonic acid, an unsaturated sulfuric ester and an unsaturated acidic phosphoric ester.

4. The electron beam-crosslinkable plastisol of claim 1 wherein the amino group-containing unsaturated compound ($B_2$) is selected from dimethylaminoethyl (meth)acrylate, diethylaminoethyl (meth)acrylate, N-t-butylaminoethyl (meth)acrylate and dimethylaminopropyl(meth)acrylamide.

5. The electron beam-crosslinkable plastisol of claim 1 wherein the component (A) epoxy group-containing vinyl chloride is crosslinkable.

6. An electron beam-crosslinkable plastisol comprising (A) a particulate epoxy group-containing vinyl chloride paste resin for plastisol processing having an epoxy group concentration on the particle surface of $1\times10^{-5}$ to $1\times10^{-3}$ g equivalent/g and an average particle size of 0.05 to 5 μm, ($B_1$) an olefinically saturated acid having a pKa less than 4, and (C) a plasticizer.

7. The electron beam-crosslinkable plastisol of claim 6, wherein the epoxy group-containing paste resin (A) is a copolymer of vinyl chloride with an epoxy group-containing monomer selected from a glycidyl ether of unsaturated alcohol, a glycidyl ester of unsaturated acid and an epoxide olefin hydrocarbon.

8. The electron beam-crosslinkable plastisol of claim 6, wherein the unsaturated acid having a pKa less than 4 ($B_1$) is an acid selected from a halogen-substituted (meth)acrylic acid, an unsaturated sulfonic acid, an unsaturated sulfuric ester and an unsaturated acidic phosphoric ester.

9. An electron beam-crosslinkable plastisol consisting essentially of (A) a particulate crosslinkable epoxy group-containing vinyl chloride paste resin for plastisol processing having an epoxy group concentration on the particle surface of $1\times10^{-5}$ to $1\times10^{-3}$ g equivalent/g and an average particle size of 0.05 to 5 μm, ($B_2$) an amino group-containing unsaturated compound and (C) a plasticizer.

10. The electron beam-crosslinkable plastisol of claim 9, wherein the epoxy group-containing paste resin (A) is a copolymer of vinyl chloride with an epoxy group-containing monomer selected from a glycidyl ether of unsaturated alcohol, a glycidyl ester of unsaturated acid and an epoxy group-containing unsaturated hydrocarbon.

11. The electron beam-crosslinkable plastisol of claim 9, wherein the amino group-containing unsaturated compound ($B_2$) is selected from the dimethylaminoethyl (meth)acrylate, diethylaminoethyl (meth)acrylate, N-t-butylaminoethyl (meth)acrylate and dimethylaminopropyl-(meth)acrylamide.

12. An electron beam-crosslinkable plastisol comprising (A) a particulate epoxy group-containing methyl methacrylate paste resin for plastisol processing having an epoxy group concentration on the particle surface of $1\times10^{-5}$ to $1\times10^{-3}$ g equivalent/g and an average particle size of 0.05 to 5 μm, ($B_1$) an olefinically unsaturated acid having a pKa less than 4, and (C) a plasticizer.

13. The electron beam-crosslinkable plastisol of claim 12, wherein the epoxy group-containing paste resin (A) is a copolymer of methyl methacrylate with an epoxy group-containing monomer selected from a glycidyl ether of unsaturated alcohol, a glycidyl ester of unsaturated acid and an epoxide olefin hydrocarbon.

14. The electron beam crosslinkable plastisol of claim 12 wherein the unsaturated acid having a pKa less than 4 ($B_1$) is an acid selected from a halogen-substituted (meth)acrylic acid, an unsaturated sulfonic acid, an unsaturated sulfuric ester and an unsaturated acidic phosphoric ester.

15. An electron beam-crosslinkable plastisol comprising (A) a particulate epoxy group-containing methyl methacrylate paste resin for plastisol processing having an epoxy group concentration on the particle surface of $1\times10^{-5}$ to $1\times10^{-3}$ g equivalent/g and an average particle size of 0.05 to 5 μm, ($B_2$) an amino group-containing unsaturated compound, and (C) a plasticizer.

16. The electron beam-crosslinkable plastisol of claim 15 wherein the epoxy group-containing paste resin (A) is a copolymer of methyl methacrylate with an epoxy group-containing monomer selected from a glycidyl ether of unsaturated alcohol, a glycidyl ester of unsaturated acid and an epoxide olefin hydrocarbon.

17. The electron beam-crosslinkable plastisol of claim 15, wherein the amino group-containing unsaturated compound ($B_2$) is selected from dimethylaminoethyl (meth)acrylate, diethylaminoethyl (meth)acrylate, N-t-butylaminoethyl (meth)acrylate and dimethylaminopropyl-(meth)acrylamide.

18. An electron beam-crosslinkable plastisol consisting essentially of (A) a particulate epoxy group-containing vinyl chloride paste resin for plastisol processing having an epoxy group concentration on the particle surface of $1\times10^{-5}$ to $1\times10^{-3}$ g equivalent/g and an average particle size of 0.05 to 5 μm, wherein the epoxy group-containing paste resin (A) is a copolymer of vinyl chloride with an epoxy group-containing monomer selected from a glycidyl ether of unsaturated alcohol, a glycidyl ester of unsaturated acid and an epoxy group-containing unsaturated hydrocarbon, ($B_2$) an amino group-containing unsaturated compound, wherein the amino group-containing unsaturated compound ($B_2$) is selected from the dimethylaminoethyl (meth)acrylate, diethylaminoethyl (meth)acrylate, N-t-butylaminoethyl (meth)acrylate and dimethylaminopropyl-(meth)acrylamide, and (C) a plasticizer.

19. The electron beam-crosslinkable plastisol of claim 18, wherein the epoxy group-containing unsaturated hydrocarbon is a monomer selected from butadiene monoxide, vinyl-cyclohexene monoxide and 2-methyl-5,6-epoxyhexene.

20. The electron beam-crosslinkable plastisol of claim 18 wherein the component (A) particulate epoxy group-containing vinyl chloride paste resin is crosslinkable.

* * * * *